United States Patent [19]

Funada et al.

[11] 4,405,209

[45] Sep. 20, 1983

[54] MATRIX LIQUID-CRYSTAL DISPLAY DEVICES

[75] Inventors: Fumiaki Funada; Toshiaki Takamatsu; Ishii Yutaka; Tomio Wada, all of Nara, Japan

[73] Assignee: Sharp Kabushiki Kaisha, Osaka, Japan

[21] Appl. No.: 233,091

[22] Filed: Feb. 10, 1981

[30] Foreign Application Priority Data

Feb. 29, 1980 [JP] Japan .................................. 55-25913

[51] Int. Cl.$^3$ ............................ G02F 1/13; C09K 3/34
[52] U.S. Cl. ................................ 350/341; 252/299.2; 252/299.4; 350/337; 350/339 R; 350/340; 350/344; 350/346
[58] Field of Search ................... 350/339 R, 340, 341, 350/344, 332, 348, 346, 337; 252/299.2, 299.4

[56] References Cited

U.S. PATENT DOCUMENTS

| | | | |
|---|---|---|---|
| 3,700,306 | 10/1972 | Cartmell et al. | 252/299.4 |
| 3,749,474 | 7/1973 | Cartmell | 252/299.68 |
| 3,888,566 | 6/1975 | Toriyama et al. | 252/299.2 |
| 3,956,168 | 5/1976 | Arai et al. | 252/299.2 |
| 4,083,099 | 4/1978 | Yano et al. | 350/341 |
| 4,151,326 | 4/1979 | Funada et al. | 252/299.4 |
| 4,155,872 | 5/1979 | Shigehiro et al. | 252/299.2 |
| 4,291,949 | 9/1981 | Wada et al. | 350/340 |

FOREIGN PATENT DOCUMENTS 2418022 11/1974 Fed. Rep. of Germany ... 350/339 R

OTHER PUBLICATIONS

Matsumoto, S., et al., Jap. J. Appl. Phys., vol. 14, No. 7, pp. 965–968 (Jul. 1975).
Alt, P. M., et al., IEEE Trans. E. D., vol. ED-21, No. 2, pp. 146–155 (Feb. 1974).
Uchida, Tatsuo; et al., IEEE Trans. Elect. Dev., vol. ED-26, No. 9, pp. 1375–1376 (1979).
Fukuda, I., et al., Mol. Cryst. Liq. Cryst., vol. 68, pp. 311–330 (1981).

*Primary Examiner*—Teddy S. Gron
*Attorney, Agent, or Firm*—Hubbell, Cohen, Stiefel & Gross

[57] ABSTRACT

There discloses a matrix liquid-crystal display device which is effective for the display of images particularly in a TV set and in which the liquid-crystal layer contains a dopant in a specific range of quantity which is far greater than a quantity of dopant employed in any known device.

8 Claims, 6 Drawing Figures

(A)

(B)

(C)

(D)

(E)

MATRIX LIQUID-CRYSTAL DISPLAY DEVICES

BACKGROUND OF THE INVENTION

1. Field of the Invention

This invention relates to a matrix liquid-crystal display device. More particularly, it is concerned with a matrix liquid-crystal diaplay device which is effective for the display of images particularly in a TV set.

2. Description of the Prior Art

A cathode ray tube (CRT) has long been, and is still the most important device for image display. Research has, however, been energetically carried out on flat panel displays, including a flat CRT, in order to develop a substitute having a smaller volume than a customary CRT. A liquid-crystal display device is a kind of flat panel display (FPD), and has recently begun to attract special attention because of its lower consumption of driving power.

The liquid-crystal display of an image, particularly a TV picture, is usually accomplished by a device having the so-called XY matrix electrode construction adapted to display picture elements. According to this device, the intersection between the Y (e.g., column) electrode and the X (e.g., row) electrode is electrically selected to define a unit picture element, and the brightness of the dot is utilized to make a display.

Such a matrix display device is, however, likely to develop a cross-talk effect causing information at a selected dot to mix into an unselected dot. Various proposals have been made to solve this problem, and can be roughly classified into (1) the optimization of the waveform of driving voltage, and (2) the optimization of the properties of display elements. It is known that in the effective voltage driving of a liquid-crystal display device, the waveform of its driving voltage can be optimized by a voltage equalization method $(1/\{\sqrt{N}+1\}$ biasing) (Kawakami and Yoneda: Proceedings of the Japanese Society of Electronic Communication, Meeting for the Study of Image Engineering, IE-46, 1974). According to this driving method, a selected dot ($V_{on}$) and an unselected dot ($V_{off}$) have an effective voltage ratio:

$$V_{on}/V_{off} = \sqrt{(\sqrt{N}+1)} / \sqrt{(\sqrt{N}-1)} \quad (P1)$$

in which N stands for the number of multiplexing, of which the reciprocal corresponds to a duty ratio. As is obvious from equation P1, the $V_{on}/V_{off}$ ratio approaches 1 with an increase in the value of N, even if the proposed driving method is employed. This means that the effective voltage of a selected dot fails to be sufficiently higher than that of an unselected dot, and a liquid-crystal display device according to a voltage selection scheme, and not having so high voltage dependence of a contrast as a discharge tube is likely to involve various problems, such as a reduction in the contrast of a display, and a slower response. In order to overcome these problems, studies have been made for a two-frequency addressing method, a multiple matrix method, a method incorporating a switching element into picture elements, or the like, but none of them has matured into practical application as yet. There is, thus, no alternative but to optimize the properties of display elements.

A mode utilizing depolarization in a twisted-nematic layer (DTN) has recently been proposed as a mode of liquid-crystal display which is suitable for matrix driving. The DTN mode is a mode of display possessing the features of both of the conventional TN (twisted nematic) and DS (dynamic scattering) types, as described in a paper by Y. Ishii, one of the inventors of the present invention, et al. (Uchida, Ishii and Wada: Proceedings of the SID, Vol. 21/2, 1980). A liquid-crystal display device employing the DTN mode is described in J. V. Cartmell's U.S. Pat. No. 3,749,474 entitled "Oriented Light Scattering Display Device".

It is an object of this invention to provide a liquid-crystal composition exhibiting the properties suited for the display of images particularly in a TV set to thereby obtain a matrix liquid-crystal display device of the DTN type provided with display elements having the optimum properties. No liquid-crystal material providing any such specific property is generally known in the prior art. It is, however, well known that in a display device of the TN type, it is preferable to use a nematic liquid-crystal of positive dielectric anisotropy (M. Shadt and W. Helfrich: Appl. Phys. Lett., Vol. 18 No. 4 page 127, 1971), while the use of a nematic liquid-crystal of negative dielectric anisotropy containing a dopant is preferred in a display device of the DS type. Preferred liquid-crystal materials for a display device of the DS type are described in U.S. Pat. No. 4,155,872 by F. Funada, one of the inventors of this invention, et al.

SUMMARY OF THE INVENTION

It is an object of this invention to provide a liquid-crystal composition exhibiting the properties suited for the display of images particularly in a TV set to thereby obtain a matrix liquid-crystal display device of the DTN type provided with display elements having the optimum properties.

The liquid-crystal display device of this invention is essentially identical in construction to any known display device of the DTN type. A twisted-nematic, dynamic-scattering liquid-crystal layer or depolarization in a twisted-nematic layer is sandwiched between a pair of transparent substrates defining a pair of mutually facing surfaces each provided with a transparent electrode, an insulating layer and a means for orienting liquid-crystal molecules. A polarizer is positioned on the opposite surface of each substrate from the liquid-crystal layer.

The device of this invention is, however, different from any known display device of the DTN type in that the liquid-crystal layer in the device of this invention contains an ionic dopant to the extent that the cut-off frequency $f_c$ (Hz) on the dynamic scattering effect of the liquid-crystal layer satisfies the following relationship relative to the number N of multiplex driving (duty ratio 1/N) within a range of ambient temperatures:

$$16 \cdot \frac{C}{C_o} \cdot N \cdot F \cdot C \gtrsim f_c \gtrsim 8NF \quad (1)$$

in which F stands for the frame frequency of an image signal, C stands for the capacitance per unit area of the insulating layers, and $C_o$ stands for the capacitance per unit area of the insulating layers when they have a specific dielectric constant of about 4 and a thickness of about 100 Å.

The quantity of the dopant required for satisfying the relationship (1) is at least about ten times greater than that of the dopant employed in any known device, but enables the reproduction of an image which is quite satisfactory in contrast and halftone.

DETAILED DESCRIPTION OF THE PREFERRED EMBODIMENT

Figure 1:
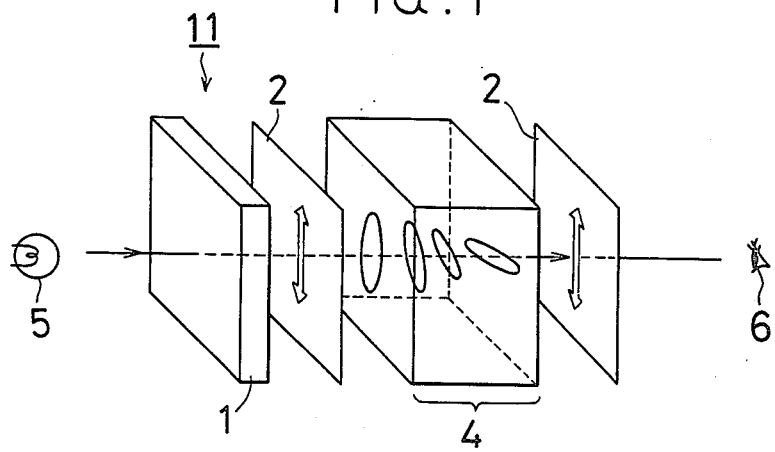
FIG. 1 is a schematic view of a liquid-crystal display device of the DTN type embodying this invention.
Figure 2:
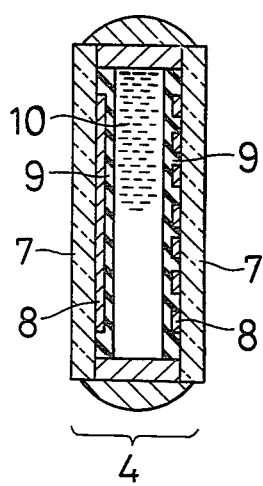
FIG. 2 is a cross-sectional view of the DS-cell employed in the device of FIG. 1.

Referring first to FIG. 1, a preferred liquid-crystal display device according to the present invention is generally designated by the reference numeral 11. The display device 11 comprises a light diffuser 1, a pair of polarizers 2, and a twisted nematic DS-cell 4. As shown in FIG. 2, the DS-cell 4 is composed of a pair of transparent substrates 7, a plurality of transparent electrodes 8 arranged in a matrix, a pair of insulating layers 9 serving also as means for the orientation of liquid-crystal molecules, and a liquid crystal layer 10 which comprises a liquid crystal composition containing a dopant. Referring to FIG. 1 again, numeral 5 denotes an illumination device, and numeral 6 indicates a viewer.

Figure 3:
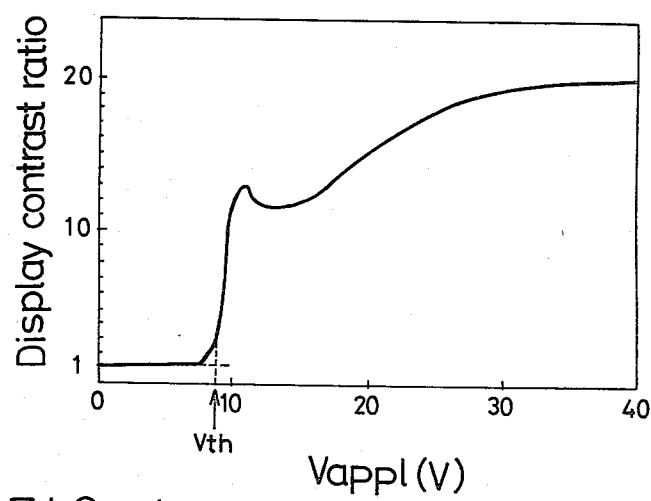
FIG. 3 is a graph showing the contrast characteristics of the DTN type.

FIG. 3 typically shows the voltage dependence of the display contrast ratio according to the DTN mode. As no satisfactory contrast ratio can be obtained below the threshold voltage $V_{th}$, it is necessary to apply a driving voltage which is at least equal to the threshold voltage $V_{th}$. As the DTN mode utilizes the DS effect, however, the threshold voltage $V_{th}$ is largely influenced by the frequency of the driving voltage. This frequency dependence of the threshold voltage is shown in FIG. 4, in which the voltage has a sinusoidal waveform, and indicates an effective value.

Figure 4:
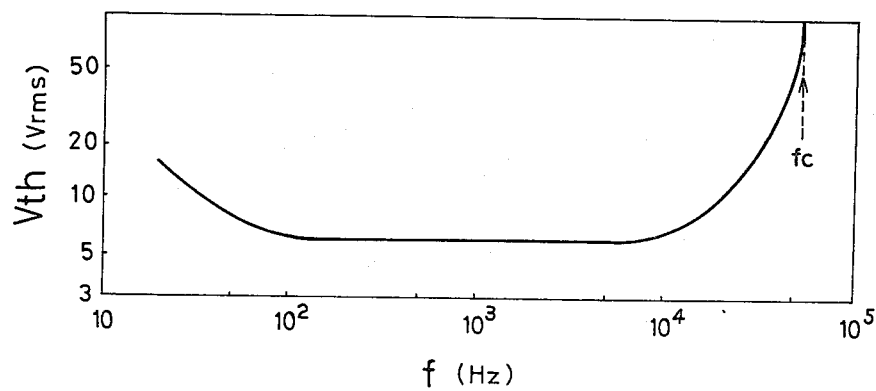
FIG. 4 is a graph showing the frequency dependence of the threshold voltage for the DTN type.

As is noted from FIG. 4, the cut-off frequency $f_c$ defines a limit beyond which the threshold voltage $V_{th}$ becomes infinitely high, and the display device fails to be driven. In other words, the driving frequency $f_d$ for the DTN mode has an upper limit depending on the value of $f_c$:

$$k_1 \cdot f_d \leq f_c \quad (2)$$

in which $k_1$ is larger than 1.

Figure 5:
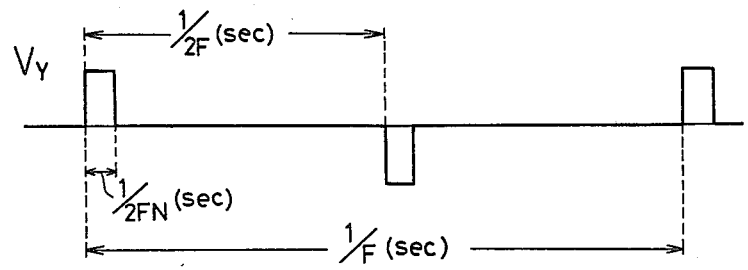
FIG. 5 consists of a number of waveform patterns showing the outline of driving voltage, i.e., (A) a waveform of voltage $V_y$, (B) a waveform of voltage $V_x$, (C) a matrix electrode arrangement, (D) a waveform of combined voltage $V_X+V_Y$, and (E) another example of waveform of combined voltage $V_X+V_Y$.
Figure 5:
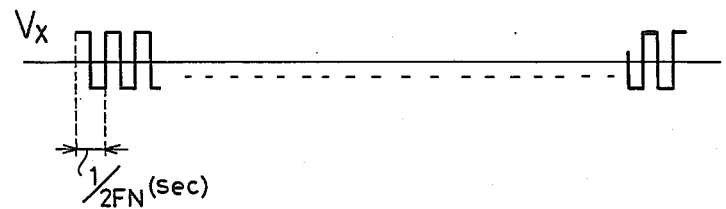
Figure 5:
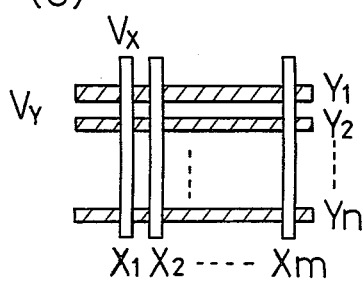
Figure 5:
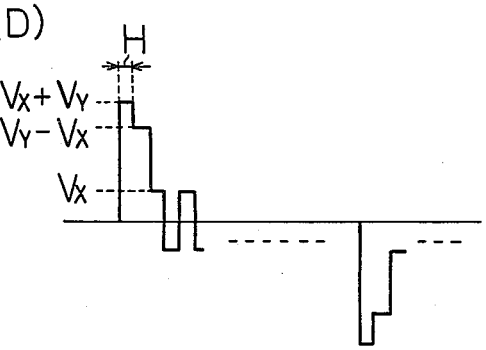
Figure 5:
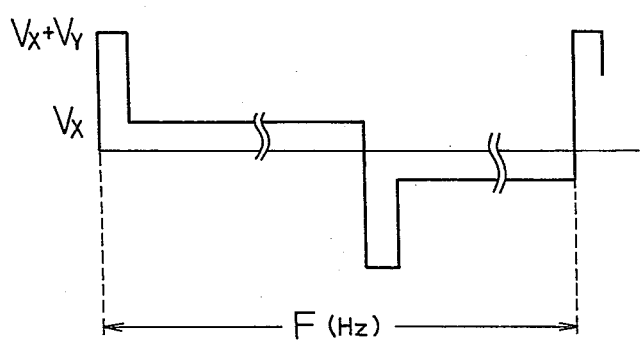
Figure 6:
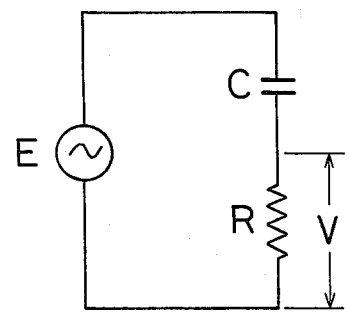
FIG. 6 is a diagram for an equivalent circuit in which a sufficiently lower frequency than the cut-off frequency $f_c$ is taken into account for the device shown in FIG. 1.

Referring more particularly to the relationship between the cut-off frequency $f_c$ and the driving frequency $f_d$, it is noted from FIG. 5 that the driving frequency $f_d$ contains a fundamental frequency component of 2FN (Hz), in which F stands for the frame frequency of an image signal, and N stands for the number of multiplex driving for the liquid crystal display device 11, if the blanking time is negligible. The driving voltage, however, has a rectangular waveform, and contains a considerably high proportion of a harmonic component. Accordingly, it is in practice necessary to take any such harmonic component into consideration in the selection of the frequency characteristics of liquid crystal elements, and this is particularly the case with a television which involves a higher harmonic proportion as it displays a halftone by pulse width modulation. Thus, if at least a secondary harmonic wave is taken into account, the driving frequency $f_d$ can be fundamentally expressed as follows:

$$f_d = 4FN \quad (3)$$

The expression (2) can be rewritten by incorporating the expression (3), as follows:

$$k_2 \cdot F \cdot N \leq f_c \quad (4)$$

in which $k_2$ is larger than 4.

While, the cut-off frequency $f_c$ shown in FIG. 4 depends on the conductivity $\sigma$ and specific dielectric constant $\epsilon$ of the liquid crystal layer 10, and can be expressed as follows:

$$f_c = K \cdot \sigma / \epsilon \epsilon_0 \quad (5)$$

in which K stands for a proportionality factor which is empirically about 0.6, and $\epsilon_0$ stands for the dielectric constant of a vacuum.

The expression (5) teaches that it is possible to obtain the cut-off frequency $f_c$ satisfying the relationship according to the expression (4), either by increasing the conductivity $\sigma$, or by decreasing the specific dielectric constant $\epsilon$.

The inventors of this invention have manufactured a lot of liquid-crystal display devices having different and progressively increasing values of conductivity by incorporating different quantities of dopant into the liquid-crystal layer, and conducted a lot of experiments for image display. As a result, they have found that an image which is satisfactory in contrast and halftone can be obtained if the dopant is incorporated in the amount satisfying the expression (4) in which $k_2$ is 8, or the following expression:

$$8 \cdot N \cdot F \leq f_c \quad (6)$$

In other words, if the liquid-crystal layer has a cut-off frequency $f_c$ which is smaller than 8NF, the liquid-crystal does not respond properly even if a signal for displaying a halftone is applied to the cell.

If in the DS-cell 4, the driving frequency $f_d$ is sufficiently lower than the cut-off frequency $f_c$, the equivalent circuit in which the insulating layers 9 are taken into account is one in which the capacitance C by the insulating layers 9 and the resistance R by the liquid crystal layer 10 are connected in series to each other. The voltage V actually applied across the liquid crystal layer 10 is:

$$V = E \times \frac{R}{\sqrt{R^2 + \frac{1}{4\pi^2 f_d^2 C^2}}} \quad (7)$$

The expression (7) can be rewritten as follows:

$$\frac{V}{E} = \frac{1}{\sqrt{1 + \left(\frac{1}{2\pi f_d CR}\right)^2}} \quad (8)$$

in which E stands for source voltage.

If it is desired to apply at least 90% of the source voltage E to the liquid-crystal layer effectively, the following relationship must be satisfied:

$$\frac{1}{2\pi f_d CR} \lesssim 0.5 \quad (9)$$

It will, thus, be noted that one of the conditions to be satisfied by the liquid-crystal display device 11 is determined by a value obtained by multiplication of the capacitance C of the insulating layers 9 disposed between the electrodes 8 and the liquid-crystal layer 10, and serving also for orientation of liquid-crystal molecules, by the resistance R of the liquid-crystal layer 10, and related to a time constant.

In view of the expression (3), the expression (9) can be rewritten as follows:

$$\frac{1}{R} \lesssim 4\pi CFN \quad (10)$$

$$\text{As } \frac{1}{R} = k_3 \cdot \sigma \quad (11)$$

and as the expression (5) can be rewritten to:

$$\sigma = \frac{\epsilon \cdot \epsilon_0 \cdot f_c}{K} \quad (12)$$

the expression (10) can be rewritten as follows:

$$f_c \lesssim \frac{4\pi K}{k_3 \cdot \epsilon \cdot \epsilon_0} \cdot CFN \quad (13)$$

If in the expression (13), $4\pi K/k_3 \cdot \epsilon \cdot \epsilon_0$ is expressed as $k_4$:

$$f_c \lesssim k_4 \cdot C \cdot F \cdot N \quad (14)$$

The expression (14) defines an upper limit to the cut-off frequency $f_c$ of the liquid-crystal layer 10.

As hereinbefore stated, the inventors of this invention have prepared a lot of liquid-crystal display devices having different and progressively increasing values of cut-off frequency $f_c$ by increasing the quantity of the dopant in the liquid-crystal layer, and conducted a lot of experiments for image display. As a result, they have discovered that an image which is satisfactory in contrast and halftone can be obtained if the dopant is incorporated in the quantity satisfying the expression (14) in which $k_4 = 16/C_0$, i.e., the following expression:

$$f_c \lesssim \frac{16}{C_0} \cdot C \cdot F \cdot N \quad (15)$$

in which $C_0$ stands for the capacitance per unit area of the insulating layers 9 when they have a specific dielectric constant of about 4, and a thickness of about 100 Å. In other words, if insulating layers ($\epsilon \approx 4$) having a thickness of about 100 Å are provided on a pair of substrates as the minimum blocking layers for obtaining a satisfactorily oriented liquid-crystal layer having a cut-off frequency $f_c$ which is greater than 16FN, voltage disadvantageously fails to be effectively applied to the liquid crystal layer, if the voltage pulse has a width H (FIG. 5, D) which is 0 or 1/2FN sec. or in the vicinity thereof.

Referring to the waveform of combined voltage $V_x + V_y$ as shown in FIG. 5 at D, if the dots along all the rows are all utilized for a dark (H=0) or bright (H=1/2FN sec.) display not belonging to the grey scale, the fundamental frequency is not 2FN (Hz), but F (Hz) (see FIG. 5, E).

The expression (1) can be derived from the expressions (6) and (15):

$$\frac{16}{C_0} \cdot C \cdot F \cdot N \gtrsim f_c \gtrsim 8 \cdot N \cdot F \quad (1)$$

Thus, the upper limit of $f_c$ is a value which depends on the conductivity of the liquid-crystal without regard to any voltage drop by the blocking layer when the fundamental frequency is F (Hz), while the lower limit of $f_c$ is a value which depends on the response to the harmonic component of the fundamental frequency.

The expression (1) does not directly express the quantity of the dopant to be incorporated into the liquid-crystal layer, because it can vary with the type of the dopant, type of the liquid-crystal material, and other factors, and cannot be expressed directly. It is, however, easily possible to determine the quantity of the dopant in accordance with the expression (1), if all of those factors are fixed. Suitable examples of liquid crystal materials include p-methoxybenzylidene-p'-butylaniline, p-ethoxybenzylidene-p'-butylaniline, 1-cyano-1-(p-ethoxyphenyl)-2-(p-hexyloxyphenyl)ethylene, and cholesteryl nonanoate. If tetrabutylammonium-3-5-dinitrobenzoate is used as a dopant, the quantity of the dopant satisfying the expression (1) may be in the range of 0.5 to 1.0% by weight of the liquid-crystal material, if the frame frequency is 60 Hz, the number of multiplexing is 60, and the insulating layers are composed of $SiO_2$ and have a specific dielectric constant of about 4 and a thickness of about 100 Å. Thus, the expression (1) based on the cut-off frequency $f_c$ can be conveniently utilized for determining the quantity of the dopant to be incorporated into the liquid-crystal layer.

According to this invention, there is, thus, provided a novel and useful liquid-crystal display device which enables, for example, effective display of an image signal by adjusting the quantity of the dopant relative to the cut-off frequency $f_c$ so that it may satisfy the relationship defined by the expression (1).

The invention will now be described more specifically with reference to a preferred embodiment thereof. The device according to this embodiment is essentially identical in construction to the device 11 as hereinabove described. The insulating layers have a specific dielectric constant $\epsilon$ of about 4 and a thickness of about 100 Å, and their capacitance is equal to $C_0$. The frame frequency F is 60 (Hz) in order to display an image signal for commercial TV broadcasting. Accordingly, the value of $f_c$ is selected so as to satisfy the following relationship:

$$8N \times 120 \gtrsim f_c(Hz) \gtrsim 4N \times 120 \quad (1')$$

It should be noted in this connection that the frame frequency F in a liquid-crystal display device corresponds to the field frequency in the case of commercial TV broadcasting, and is, therefore, twice as high as the frame frequency $F_{TV}$ in commercial TV broadcasting. This higher frame frequency is intended for reducing flicker in a picture.

It is empirically known that a matrix display of a TV picture requires a minmum of 160×120 picture elements. Therefore, if matrix driving is simply performed, there are required 160 row electrodes and 120 column electrodes, and the number N of multiplexing is 120. The value of $V_{on}/V_{off}$ is 1.10 in accordance with the expression (P1). If the DTN mode is driven at the $V_{on}/V_{off}$ ratio of 1.10, however, it requires a response time of as long as about one second even if the thickness of a liquid-crystal layer is as small as about 7 μm, and makes it difficult to display a moving picture.

If the row electrodes are centrally divided into two groups to which data signals ($V_x$) are applied independently, the number N of multiplexing can be reduced to a half, and is 60 in the event there are 120 line electrodes. The value of $V_{on}/V_{off}$ is 1.14 in accordance with the expression (P1), so that it is possible to obtain the response characteristics of the DTN mode which permit a display of a moving picture.

In the event N is 60, it is desirable to select the cut-off frequency $f_c$ from a range of 29 to 58 kHz in order to satisfy the relationship defined by the expression (1'). Such a range of $f_c$ can be obtained if the following proportions of the following liquid-crystal materials and dopant are employed:

| | Proportion (wt. %) |
|---|---|
| Liquid-crystal materials: | |
| $CH_3O$—⟨◯⟩—CH=N—⟨◯⟩—$C_4H_9$ | 45 |
| $C_2H_5O$—⟨◯⟩—CH=N—⟨◯⟩—$C_4H_9$ | 45 |
| $C_2H_5O$—⟨◯⟩—C(CN)=CH—⟨◯⟩—$OC_6H_{13}$ | 9.82 |
| Cholesteryl nonanoate | 0.18 |
| Dopant: | |
| $(C_4H_9)_4N^+OC(=O)$—⟨◯⟩(NO_2)(NO_2) | 0.5 to 1.0% by weight of the liquid-crystal materials. |

A liquid-crystal composition formed from a mixture of the aforesaid liquid-crystal materials and dopant was sandwiched between a pair of substrates each comprising a plate of soda-lime glass having a thickness of 2 mm, and on which ITO transparent electrodes had been formed in a striped pattern. The liquid-crystal layer had a thickness set at 7 μm±1 μm in order to prevent any reduction in contrast by optical rotatory dispersion due to the Mauguin limit, and obtain the satisfactory response characteristics.

A layer for the homogeneous orientation of liquid-crystal molecules with a low tilt angle was obtained by forming a display surface with a film of $SiO_2$ ($\epsilon \cong 4$) having a thickness not exceeding about 100 Å as an insulating layer, and coating the $SiO_2$ film with a silane coupling agent (Toray Silicone Co., Ltd., SH6040). The surfaces were rubbed for the alignment of the liquid-crystal molecules, and their twisted orientation was achieved by a twist between the substrates at an angle of about 90° relative to each other. A film of hot-melt type nylon 12 (Disel Ltd., Diamide) was used as a sealing material.

The liquid-crystal composition was introduced into the space between the substrates by vacuum injection, and a pool holding nearly the same quantity of liquid-crystal composition as that filling the space between the substrates was provided at a position which was diagonally the remotest from the injection port, in order to reduce the chromato effect of the dopant. The liquid-crystal pool is removable after the space between the substrates has been filled with the liquid-crystal composition.

The polarizers were made of Polaroid's HN-38, and the diffuser was formed from a white plate of acrylite made by Mitsubishi Rayon Co., Ltd. The light source was a 35 mm film projector made by Minolta Camera Co., Ltd., and a microscopic blue filter made by Nippon Kogaku K.K. was used as a filter for cutting heat rays.

The display device constructed as hereinabove described was driven by the driving voltage of which the waveforms are shown in FIG. 5 ($V_X$=4.9 V, and $V_Y$=38 V), and produced a satisfactory TV picture. The cut-off frequency $f_c$ was in the range of 29 kHz to 58 kHz at 25° C.

Satisfactory TV pictures could not be obtained when the dopant was incorporated in the quantity of 0.1% by weight (corresponding to the cut-off frequency $f_c$ of 6 kHz), and 2.0% by weight (corresponding to the cut-off frequency $f_c$ of 116 kHz).

A liquid-crystal composition of negative dielectric anisotropy is suitable for use with the liquid-crystal display device of this invention, and may be prepared from the following materials, in addition to those hereinbefore mentioned:

(a) $C_2H_5O$—⟨◯⟩—C(CN)=CH—⟨◯⟩—$OC_6H_{13}$ $T_{CN}$ = 65° C.   $T_{NI}$ = 78° C.

and other liquid-crystals of the stilbene series;

(b) $CH_3O$—⟨◯⟩—N=N(O)—⟨◯⟩—$C_4H_9$ $T_{CN}$ = 20° C.   $T_{NI}$ = 80° C.

and other azoxy liquid-crystals;

(c) $C_5H_{11}$—⟨◯⟩—⟨◯⟩—$OC_2H_5$ and other biphenyl liquid-crystals;

$T_{CN} = 72°$ C.   $T_{NI} = 81°$ C.

(d) 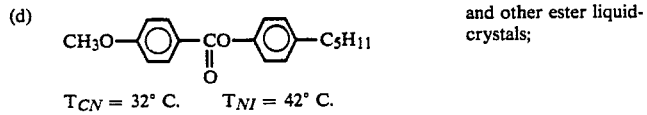 and other ester liquid-crystals;

$T_{CN} = 32°$ C.   $T_{NI} = 42°$ C.

(e) 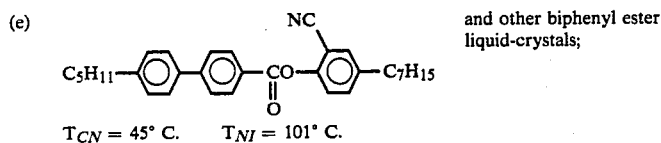 and other biphenyl ester liquid-crystals;

$T_{CN} = 45°$ C.   $T_{NI} = 101°$ C.

(f) 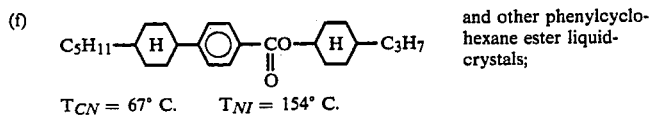 and other phenylcyclohexane ester liquid-crystals;

$T_{CN} = 67°$ C.   $T_{NI} = 154°$ C.

(g) 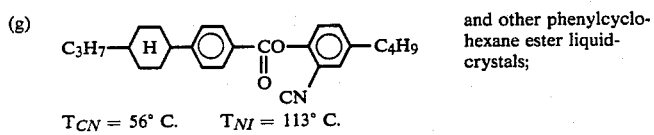 and other phenylcyclohexane ester liquid-crystals;

$T_{CN} = 56°$ C.   $T_{NI} = 113°$ C.

(h) 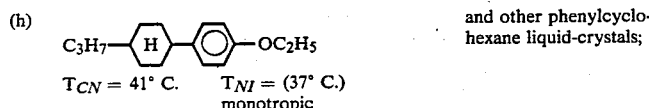 and other phenylcyclohexane liquid-crystals;

$T_{CN} = 41°$ C.   $T_{NI} = (37°$ C.) monotropic (i) 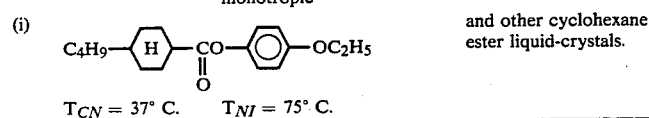 and other cyclohexane ester liquid-crystals.

$T_{CN} = 37°$ C.   $T_{NI} = 75°$ C.

A liquid-crystal composition may be either a mixture of liquid-crystals belonging to one of the aforesaid groups, or a mixture of liquid-crystals selected from two or more groups. It is also possible to use a mixture of liquid-crystals not shown above if it has negative dielectric anisotropy. It is also possible to incorporate a minor quantity of an optically active substance such as cholesteryl nonanoate and

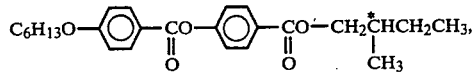

and other additives in order to improve the various properties of the liquid-crystal composition.

The dopant incorporated into the liquid-crystal display device of this invention may be selected from among a variety of quaternary ammonium compounds known in the art. It has been ascertained that as according to this invention, a larger quantity of dopant is used than heretofore, it is better to use salts of organic acids as shown below by way of example than salts of strong acids such as $(C_4H_9)_4N^+Br^-$, since the former salts are less likely to influence the decomposition of liquid-crystal molecules.

Examples of the quaternary ammonium compounds which are particularly suitable for use as the dopant include the following:

(a) Tetrabutylammonium salt of benzoic acid

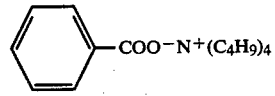

(b) Tetrabutylammonium salt of p-nitrobenzoic acid

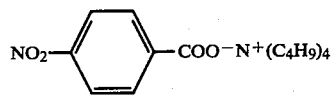

(c) Tetrabutylammonium salt of p-chlorobenzal-p'-aminobenzoic acid

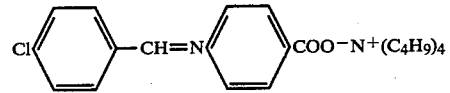

(d) Tetrabutylammonium salt of p-carboxybenzolamino-p'-chlorobenzene

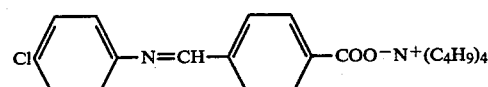

(e) Tetrabutylammonium salt of terephthalic acid

(f) Tetrabutylammonium salt of 3,5-dinitrobenzoic acid

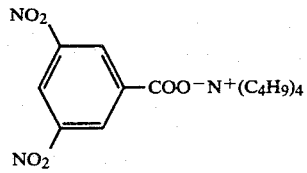

(g) Tetrabutylammonium salt of p-butoxybenzoic acid

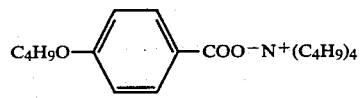

(h) Tetrahexylammonium salt of benzoic acid

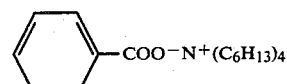

Since these as well as other modifications and changes are intended to be within the scope of the present invention, the foregoing description should be construed as illustrative and not in the limiting sense, the scope of the invention being defined by the appended claims.

What is claimed is:

1. A matrix liquid-crystal display device for video image using DTN mode comprising a pair of transparent substrates defining a pair of mutually facing surfaces, transparent electrodes provided on each of said surfaces, an insulating layer with orienting property formed on said electrodes on each of said surfaces, a liquid-crystal layer formed by depolarization in a twisted-nematic layer, said liquid crystal being nematic with a negative dielectric anisotropy, and sandwiched between said mutually facing insulating layers, and a polarizer provided on the opposite surface of each of said substrates from said liquid-crystal layer, and the liquid-crystal layer contains an ionic dopant such that the cut-off frequency Fc(Hz) of said liquid-crystal layer satisfies the following relationship within a range of ambient temperatures:

$$16 \frac{C}{C_o} \cdot N \cdot F \gtrsim f_c \gtrsim 8 \cdot N \cdot F$$

in which N stands for the number of multiplex driving, F stands for the frame frequency of an image signal, C stands for the capacitance per unit area of said insulating layers, and $C_o$ stands for the capacitance per unit area of said insulating layers when they have a specific dielectric constant $\epsilon$ of about 4 and a thickness of about 100 Å, where the $f_c$ value of the device is at least about 29 kHz, and such that the reproduction of a video image with a half-tone is achieved.

2. A device as set forth in claim 1, wherein said frame frequency F is 60 Hz, so that said device may be used for the display of a TV picture by commercial TV broadcasting at a frame frequency $F_{TV}$ of 30 Hz.

3. A device as set forth in claim 2, wherein said insulating layers have a thickness of about 100 Å and a specific dielectric constant $\epsilon$ of about 4, said frame frequency F is 60 Hz, and said liquid-crystal layer contains said dopant to the extent that said cut-off frequency $f_c$ satisfies the following relationship:

$$960N \geq f_c \geq 480N$$

so that said device may be used for the display of a TV picture by commercial TV broadcasting at a frame frequency $F_{TV}$ of 30 Hz.

4. A device as set forth in claim 3, wherein said liquid-crystal composition is composed of Schiff's base liquid-crystal materials.

5. A device as set forth in claim 1, 3, or 4, wherein said dopant comprises a quaternary ammonium compound.

6. A device as set forth in claim 1 or 5, wherein said dopant comprises tetrabutylammonium-3,5-dinitrobenzoate.

7. A device as set forth in claim 3, wherein said liquid-crystal layer has a thickness of $7\mu \pm 1\mu$.

8. A device as set forth in claim 1, wherein $f_c$ is in the range of from about 29 to about 58 kHz.

* * * * *